United States Patent [19]

Keys

[11] Patent Number: 5,197,324
[45] Date of Patent: Mar. 30, 1993

[54] METHODS AND APPARATUS USING A GEL TO ISOLATE MAINLINE VALVES IN A PIPELINE DURING A HYDROTEST

[75] Inventor: Mark S. Keys, Missouri City, Tex.

[73] Assignee: Dowell Schlumberger Incorporated, Tulsa, Okla.

[21] Appl. No.: 835,695

[22] Filed: Feb. 12, 1992

[51] Int. Cl.⁵ ............................................. G01M 3/02
[52] U.S. Cl. ................................. 73/40.5 R; 73/49.1; 73/49.8; 138/90
[58] Field of Search ................. 73/40.5 R, 49.1, 49.5, 73/49.8; 138/90

*Primary Examiner*—Hezron E. Williams
*Assistant Examiner*—Michael Brock
*Attorney, Agent, or Firm*—Littlefield, Stephen A.

[57] ABSTRACT

In accordance with illustrative embodiments of the present invention, the mainline valves in a crude oil, gas, water or other product pipeline are positively sealed off to allow a hydrotest to be made of a section or segment of the pipeline between the valves. The section is packed with water, and then a mixture of a highly viscous, aqueous-based gel material and a lost-circulation material are injected into the pipeline segment adjacent each valve to form a plug in the line. The gel plugs then are squeezed under pressure against the internal components of each valve to cause all leakage paths therein to be bridged over and sealed off. Then the pipeline segment is hydrotested to determine if there are any leaks therein, after which the gel is flushed out of the line, broken down into a linear pumpable state, and disposed of.

27 Claims, 1 Drawing Sheet

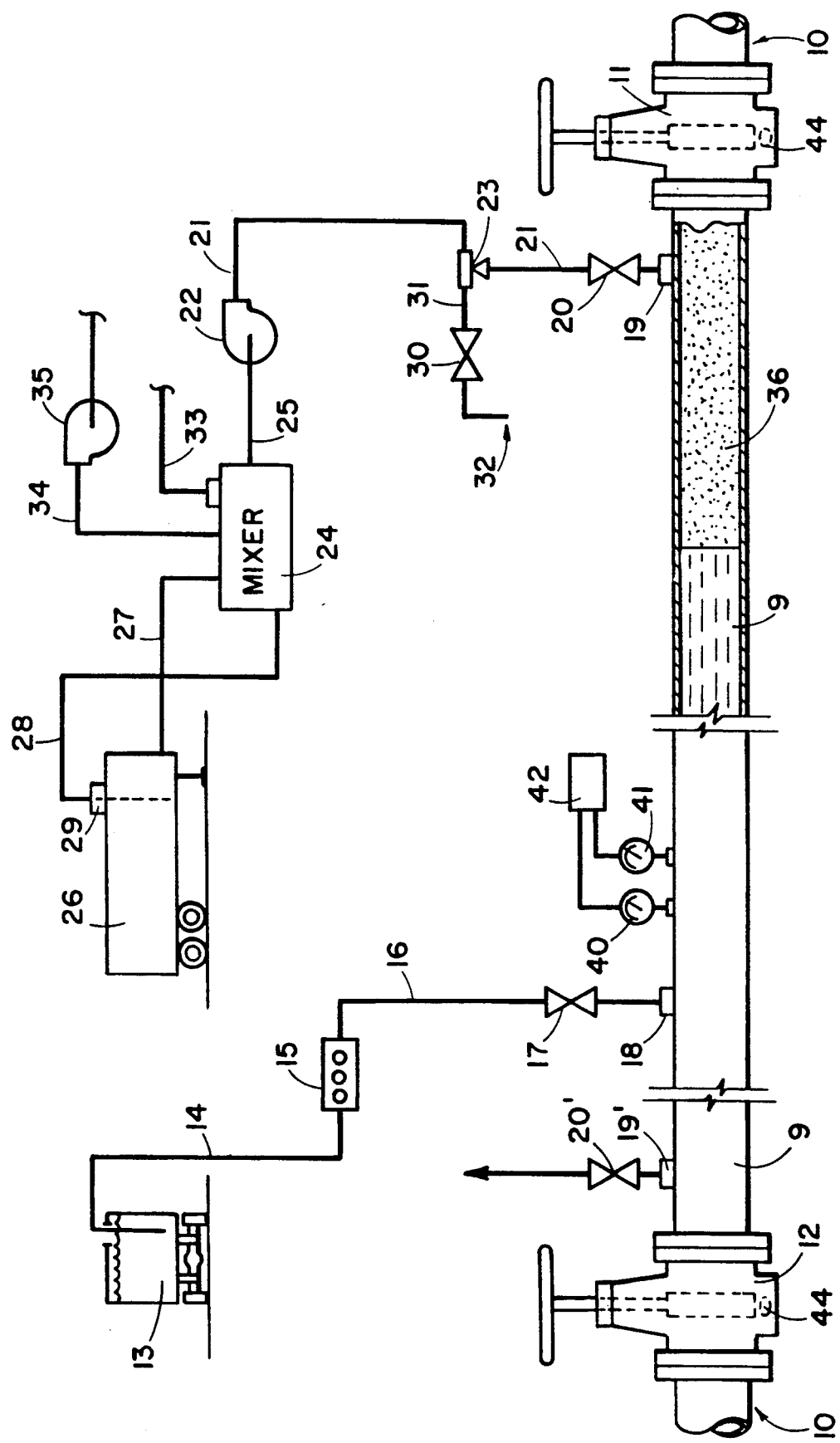

METHODS AND APPARATUS USING A GEL TO ISOLATE MAINLINE VALVES IN A PIPELINE DURING A HYDROTEST

FIELD OF THE INVENTION

This invention relates generally to the testing of a section or segment of an oil, gas, water or other product pipeline, which has mainline valves at the opposite ends of the segment, with water under pressure (hereafter "hydrotesting" or "hydrostatic testing"). More particularly the present invention relates to new and improved methods and apparatus for positively sealing off any leaks in such valves so that the line segment can be hydrotested in a reliable, efficient and economical manner.

BACKGROUND OF THE INVENTION

A large diameter pipeline that is used to convey fluid products such as crude oil, water or gas over long distances, for example between an oil field and a refinery or another pipeline, must occasionally be tested to confirm that there are no leaks in the line which could pose a hazard to the environment or to individuals or property along the route. Testing also must be performed on all new or pre-commissioned lines, as well as after a leak has been located and repaired in an operational pipeline. To test a pipeline, a procedure generally known as hydrotesting can be used which involves replacement of the product in the line with water, pressurizing the water to a predetermined value, and monitoring the pressure and temperature of the water in the line to determine if there are any leaks. Although a test of an entire pipeline conceivably could be accomplished in a single operation, it is more typical for a series of independent tests to be made of relatively short-length segments thereof. This is because a pipeline, which may be many hundreds or even thousands of miles long, usually is divided into segments that have mainline valves at each end. These valves may be anywhere from a few miles to hundreds of miles apart. Since testing involves temporary shut-down of the pipeline, which adversely impacts the operation of those refineries and other facilities which depend upon its throughput, there is a compelling need to conduct hydrotesting operations as quickly, reliably and economically as possible.

To conduct a meaningful hydrotest of a pipeline segment, there must be assurance that the test segment is positively isolated. If the valves that are used to isolate the test segment leak during the test, it is not possible to determine from water pressure and temperature data whether the pipeline segment itself will hold pressure or not. Therefore some means should be provided to positively seal off these valves during the test so that if the test pressure drops off, the leak must be somewhere in the segment. In the past, one process that has been used involves cutting the pipeline and installing test headers to isolate the mainline valves during testing. This procedure is very labor intensive and costly, takes a considerable amount of time, and is destructive to the pipeline. Another technique that has been tried is to form ice plugs adjacent the mainline valves by freezing. However, this technique is not particularly feasible for use in connection with a large diameter pipeline. Thus the problem of providing a quickly implemented, economical and reliable way to positively seal off a mainline, a branch line or a cross-over valve during a hydrotest of a pipeline segment remains unsolved.

An object of the present invention is to provide new and improved methods and apparatus for positively sealing off a mainline or other valve in a pipeline which obviates the foregoing problems and difficulties with prior schemes.

Another object of the present invention is to provide new and improved methods and apparatus of the type described where a gel mixture that can be easily injected into, and removed from, an inner region of a pipeline adjacent a mainline valve is used to positively seal off the valve during a hydrotest.

Still another object of the present invention is to provide new and improved methods and apparatus of the type described where an aqueous-based highly viscous gel having a lost-circulation material suspended therein is injected into the pipeline adjacent a mainline or similar valve which bridges over and seals off any leakage paths in the valve so that a segment of a pipeline having the valve therein can be hydrotested.

SUMMARY OF THE INVENTION

These and other objects are attained in accordance with the concepts of the present invention through the provision of a pipeline testing procedure where a segment or section of the pipeline having a mainline valve at each end is filled or packed with water under pressure, and then each of the valves is sealed off by injecting a mixture of an aqueous-based, highly viscous cross-linked gel and a lost-circulation material into the interior of the pipeline segment at locations adjacent each valve to form gel plugs at each location. The gel plugs squeeze against the respective valve elements and their seats. If any leakage paths are present therein, the gel and lost-circulation material will bridge over and seal off all such paths so that water pressure can be maintained within the interior of the line segment during the test, unless, of course, the segment leaks. After completion of the test, the respective gel plugs are flushed out of the line, for example by opening the point of injection and allowing the hydrotest water to displace the gel under pressure into a nearby tank or transport truck. After flushing, no appreciable solid matter is left in the pipe. Then the gel is broken down into a linear pumpable state so that it can be disposed of in an environmentally sound manner.

BRIEF DESCRIPTION OF THE DRAWINGS

The present invention has other objects, features and advantages which will become more clearly apparent in connection with the following detailed description of preferred embodiments, taken in conjunction with the appended drawing in which:

The drawing FIGURE is a schematic illustration of a segment of a pipeline being hydrotested in accordance with the present invention.

DETAILED DESCRIPTION OF PREFERRED EMBODIMENTS

With reference to the drawing FIGURE, a section or segment 9 of a pipeline 10, which may, for example, have a diameter in the order of 6–48 inches, is shown as having mainline valves 11 and 12 connected at the opposite ends thereof. The valves 11 and 12 typically are large gate or ball valves which can be equipped with typical block and bleed ports 44. The pipeline 10 may be many hundreds or even thousands of miles long, and a large number of the valves 11 or 12 are connected therein at spaced points to divide the line into a large number of the individual segments 9. Each segment 9 may be, for example, from a few miles to hundreds of miles long, depending on elevation changes along the line and other factors. As is well known to those familiar with this art, the large size mainline valves 11 and 12 have a propensity to leak due to age, corrosion, debris or defect, to an extent which will prevent testing of the pipeline segment 9 unless something is done to prevent leakage of the valves. Of course if either of the valves 11 or 12 leaks into an adjacent section of the pipeline, there is no way to determine from water pressure and temperature data taken from the segment 9 whether there is a leak therein or not. In accordance with this invention, however, the valves 11 and 12 are sealed off by injecting a gel plug into the segment 9 adjacent each valve which enables a meaningful hydrotest of the segment to be performed.

For purposes of simplification, the right side of the drawing shows only those equipment components which are used to isolate the mainline valve 11, and it will be recognized that an identical set of such equipment components also is located adjacent the other valve 12 and used to isolate it in the same way. Two crews can be employed to operate both sets of equipment simultaneously, or one crew can seal off the valve 11 and then move down and seal off the other valve 12, or vice-versa. After each of the valves 11 and 12 has been sealed off, then a hydrotest can be made of the pressure integrity of the segment 9 using the equipment components shown at the top center of the drawing FIGURE.

The hydrotest components that are used in connection with the present invention include a tank 13 that is filled with water and connected by a line 14 to a pump 15 whose discharge side is connected to the interior of the segment 9 by a flow line 16, a control valve 17 and a coupling such as a hot tap 18. The pump 15 usually is a positive displacement device such as a multi-plex pump. Gauges 40 and 41 are used to monitor the pressure and temperature of the water in the segment 9, and a recorder 42 can be used to provide a test record. These can be located in the near vicinity of one of the valves 11 or 12, or somewhere along the segment 9 near the center thereof.

The gel plug injection equipment includes another hot tap 19 or the like, which is made a short distance (for example about 1-2 feet), from the mainline valve 11. The tap 19 connects a control valve 20 and a line 21 to the discharge side of a pump 22 via a tee 23. The pump 22 is connected to the outlet of a batch mixer 24 by a flow line 25, and the mixer is connected to a drain outlet on a truck transport tank 26 by another line 27. The tank 26 has a fairly large capacity, and initially is filled with water. A circulating line 28 goes from the mixer 24 through an access port 29 in the top of the tank 26 and extends down to near the bottom wall thereof as shown in dotted lines. In this manner the lines 27 and 28 and an auxiliary pump (not shown) in the mixer 24 can be used to circulate between the tank 26 and the mixer 24 while a gelling agent and other substances and additives are mixed with the water in the tank. A valve 30 and a line 31 from the tee 23 in the flow line 21 are used to provide a sampling point 32 where certain characteristics of the gel being pumped into the interior of the pipeline segment 9 through the line 21, the valve 20, and the hot tap 19 can be monitored.

A gel mixture that is formed by operation of the above components is injected into the interior of the pipeline segment 9 through the hot tap 19 to provide a gel "plug" 36 adjacent the mainline valve 11. The gel preferably is an aqueous-based, highly viscous, cross-linked polysaccharide derivative having a hydroxypropyl guar as a gelling agent to form a product that is viscoelastic, cohesive, and which has a "jello pudding"-like consistency. The mixture further includes a suspended lost-circulation material, which preferably consists of cellophane flakes or chips. The gelling agent is mixed with the water in the transport tank 26 by circulation through the lines 27, 28 to provide a concentration range of from 60-100 lbs. per 1,000 gallons. The lost-circulation material is added at the mixer 24 as indicated by the arrow 33, preferably in the range of from 0.25-1% by weight. Boric acid is used as the basis for cross-linking, and soda ash or sodium hydroxide is used as an activator. The activator is added to the mix by line 34 and a pump 35. Cross-linking occurs as the Ph of the gel is raised above about 8.5-9.5, with a preferred maximum Ph of about 10-10.5, and occurs substantially immediately when this condition is reached. Cross-linking functions to suspend the lost-circulation material in the gel in a uniform manner.

The gel is pumped by 22 through components 21, 20 and 19 and is injected into the segment 9 in a selected volume such that the plug 36 has a length, for example, of about 50 feet. During injection the Ph of the gel is monitored at sampling point 32. When injection of the plug 36 is completed the pump 22 is shut down and the valve 20 is closed. The water in the segment 9 then is pressurized through operation of the pump 15, which squeezes the gel against the internal components of the valve 11 so that it seeks out and bridges over any leaks therein. The pipeline segment 9 then can be hydrotested with assurance that any leaks which are discovered are in the segment rather than in a valve.

Alternative gel materials that can be used are any aqueous-based gels that include galactomannen gum or a derivative thereof such as guar gums, locust bean gums, polysaccharide derivaties, and using hydroxypropyl guar, hydroxyethyl guar, carboxymethyl guar and others as a gelling agent. Sodium carbonate (soda ash) or sodium hydroxide can be used as an activator. The gel and agent are cross-linked generally by using some form of a polyvalent metal ion. Although cellophane flakes or chips are a preferred lost-circulation material, other materials that can be used are sawdust, cracked pepper or naphtha, small mothball or waxy resin beads. Other flake, granular, and fibrous substances also can be used.

OPERATION AND USE

To hydrotest a segment 9 of the pipeline 10, the fluid product in the segment is replaced with water by any suitable means, and the mainline valves 11 and 12 are closed. The water is "packed" into the segment 9 by pressurizing to about 300 psi or other pressure which will ensure that there are no compressed air pockets therein. Then the gel is injected into the interior of the segment 9 at each end thereof adjacent the respective valves 11 and 12 as shown in the drawing. The basic gel mixture is formed in the transport tank 26 by circulating through the lines 27 and 28 to mix the gelling agent with the water therein. Various additives such as an antifoam agent or a bactericide also can be added during this phase, as well as the material which provides a basis for cross-linking. Then the proper amount of activator is supplied to the mixer 24 by using the pump 35 and the flow line 34, which causes substantially immediate cross-linking. The proper amount of lost-circulation material also is dumped into the mixer 24, and is held in suspension by the cross-linked constituents of the gel. The pump 22 is operated to inject a predetermined volume of gel and suspended lost-circulation material into the line segment 9 adjacent the valve 11. As mentioned above, the length of the plug 36 can be about fifty (50) feet in a 6-48 inch diameter pipeline.

After the pump 22 is shut down and the valve 20 closed, the water pressure is raised to the predetermined hydrotest pressure, generally in the range of 500-2,000 psi, by operating the pump 15 of the hydrotest unit. If there are any leaks in the internal parts of the valve 11, the right end of the plug 36 will be positively squeezed against the valve and will seek out and flow into all leakage paths that exist. In short order, these leakage paths will be bridged over by the gel and lost-circulation material as they migrate through the leaks and form a bubble-tight seal, which enables the pipeline segment 9 to be hydrotested by applying pressure thereto with the pump 15. Test pressures and temperatures are monitored on a continuous basis by the gauges 40 and 41 and are recorded at 42.

If the test pressure drops off over a period of time, and cannot be correlated with a temperature change, then there is a leak somewhere in the segment 9 that needs to be located and repaired. If the test pressure holds steady over a number of hours, it can be concluded that the segment 9 has no holidays which need attention. When the test is completed, a vent, for example one associated with the 2 inch control valve 17, is opened to bleed the water pressure in the line segment 9 down. The head or break tank 13 and the pump 15 of the hydrotest unit can be located near the center of the segment 9, or a fairly short distance from one of the valves 11 or 12, typically where utilities including an ample supply of water are available.

After the hydrotest is completed, the gel plug 36 is flushed out of the segment 9 at each end and into an available transport tank by opening an available flow port, for example the 2 inch injection valve 20 near the mainline valve 11. The plug at the other end of the segment 9 also is removed through components 19' and 20'. After removal, the gel is broken down into a linear pumpable state by either adding acid to decrease the Ph to about 5, or in any event below 7, or by adding an oxidizer such as ammonium persulfate, hydrogen peroxide, or sodium nitrite. Such additives cause a breakdown of the cross-link of the gel materials and thereby reduce its viscosity so that the gel can be readily pumped. Optionally, the linear gel can be filtered and strained to remove most if not all of the lost-circulation material therefrom. The resultant liquid then can be readily disposed of in an environmentally sound manner, along with the hydrotest water. Finally the water in the segment 9 can be displaced by the pipeline cargo, and the pipeline 10 put back into operation. Of course other segments 9 of the pipeline 10 can be tested in the same way.

Although not shown in the drawing figure, valves in the bypass lines which typically are found at each station along the pipeline can be sealed off in the same manner as disclosed above. Where a bypass valve or a branch line valve is located fairly close to one of the mainline valves 11, 12, both valves can be sealed off simultaneously by using a longer plug of gel than the length of the plug 36.

It now will be recognized that new and improved methods and apparatus have been disclosed for sealing off mainline, branch or bypass valves in a pipeline so that individual segments thereof can be hydrotested in a quick, reliable and economical manner. The method avoids the installation and use of various expensive and destructive mechanical devices such as test headers. After a test of the pipeline segment is completed, the gel plug can be flushed out, broken down and disposed of in an environmentally sound manner. Since certain changes or modifications may be made in the disclosed embodiment without departing from the inventive concepts involved, it is the aim of the appended claims to cover all such changes and modifications falling within the true spirit and scope of the present invention.

What is claimed is:

1. A method of sealing off a valve at one end of a segment of a pipeline which carries a product, to thereby enable said segment to be hydrotested, comprising the steps of: filling said segment with water and then closing said valve; injecting a selected quantity of a highly viscous gel having a lost-circulation material suspended therein into said segment adjacent said valve; squeezing said gel and lost-circulation material into any leakage paths present in the internal components of said valve; and applying test pressure to said water over a period of time to determine whether there are leaks in said segment of said pipeline.

2. The method of claim 1 wherein said gel is an aqueous-based, cross-linked, polysaccharide derivative.

3. The method of claim 2 wherein a hydroxypropyl guar is used as a gelling agent.

4. The method of claim 3 wherein a polyvalent metal ion is used as a cross-linking activator.

5. The method of claim 3 wherein said gelling agent is used in concentrations ranging from 60-100 lbs./1,000 gallons of water.

6. The method of claim 1 wherein said lost-circulation material is constituted by cellophane flakes.

7. The method of claim 1 including the further steps of flushing said gel out of said segment; breaking down said gel into a linear pumpable state; and then disposing of said gel.

8. The method of claim 7 wherein said flushing step is carried out by opening a bleed port; and allowing water pressure in said segment to cause said gel and lost-circulation material to be flushed out of the region adjacent said valve via said bleed port.

9. The method of claim 1 where a gel is formed by admixing a gelling agent with water, said gelling agent being a polysaccharide derivative selected from the group consisting of locust bean gum, hydroxypropyl guar, hydroxyethyl guar and carboxymethyl guar.

10. The method of claim 1 wherein said lost-circulation material is selected from a group comprising cellophane flakes, sawdust, cracked pepper, naphtha, mothball, waxy resin beads, and gilsonite.

11. The method of claim 1 wherein said gelling agent is cross-linked using boric acid as a cross-linking compound and an activator.

12. The method of claim 11 wherein the Ph of said gel is established in the range of 8.5 to 10.5.

13. The method of claim 1 wherein said lost-circulation material is added to the gel in the range of 0.25-1% by weight.

14. A method of sealing off the mainline valves at the opposite ends of a segment of a pipeline which carries a product to enable said segment to be hydrotested for leaks, comprising the steps of: displacing said product with water and then closing said valves; injecting a selected amount of a highly viscous gel having a lost-circulation material suspended therein into said segment to form a gel plug adjacent each of said valves; and applying test pressure to said water at a point in said segment that is between said gel plugs to cause each of said gel plugs to be forced into any leakage paths that exist in the internal components of respective ones of said valves in order to bridge over and close off said leakage paths.

15. The method of claim 14 wherein said gel plugs are formed substantially simultaneously by crews working adjacent each of said valves.

16. The method of claim 15 wherein said gel plugs are formed sequentially by a single crew working adjacent each of said valves.

17. Apparatus for use in sealing off a valve at the end of a segment of a pipeline that carries a product to enable said segment to be hydrotested for leaks, comprising: means for displacing said product in said segment with water; means for injecting a selected amount of a highly viscous gel material having a lost-circulation material suspended therein into a segment adjacent said valve; means for squeezing said gel and lost-circulation material into any leakage paths that exist in the internal components of said valve and thereby bridge over and seal off said leakage paths; and means for applying test pressure to said water over a period of time to determine whether there are leaks in said pipeline segment.

18. The apparatus of claim 17 wherein said gel is a polysaccharide or derivative thereof.

19. The apparatus of claim 17 wherein said gel material includes hydroxpropyl guar as a gelling agent.

20. The apparatus of claim 17 wherein said lost-circulation material is cellophane flakes.

21. The apparatus of claim 17 wherein said gel material is a guar gum or derivative thereof.

22. The apparatus of claim 21 wherein said guar gum is selected from a group consisting of locust bean gum, hydroxypropyl guar, hydroxyethyl guar, carboxymethyl guar, and a polysaccharide derivative.

23. The apparatus of claim 17 wherein said lost-circulation material is selected from a group consisting of cellophane flakes, sawdust, cracked pepper, and naptha, mothball, or waxy resin beads.

24. The apparatus of claim 17 wherein said gel material is mixed with water to provide a concentration range of from 60–100 lbs./1,000 gallons of water.

25. The apparatus of claim 17 wherein said lost-circulation material is mixed with said gel in a range of from 0.25–1% by weight.

26. The apparatus of claim 17 further including means to enable flushing said gel material out of said segment after a hydrotest thereof is completed.

27. The apparatus of claim 26 further including means for breaking down said gel material into a linear pumpable state.

* * * * *